(12) United States Patent
Eisenbarth (10) Patent No.: US 7,854,292 B2
(45) Date of Patent: Dec. 21, 2010

(54) POWER ASSISTED STEERING SYSTEM WITH AN AUXILIARY ELECTRIC PUMP

(75) Inventor: Mark Alton Eisenbarth, Summerfield, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 375 days.

(21) Appl. No.: 12/085,788

(22) PCT Filed: Dec. 21, 2005

(86) PCT No.: PCT/US2005/046642

§ 371 (c)(1),
(2), (4) Date: May 30, 2008

(87) PCT Pub. No.: WO2007/073375

PCT Pub. Date: Jun. 28, 2007

(65) Prior Publication Data

US 2009/0194361 A1  Aug. 6, 2009

(51) Int. Cl.
*B62D 5/00* (2006.01)
*B62D 5/06* (2006.01)

(52) U.S. Cl. .................. 180/422; 180/405; 180/421; 180/423

(58) Field of Classification Search .......... 180/417, 180/421, 422, 441, 442, 405, 406, 407, 423
See application file for complete search history.

(56) References Cited

U.S. PATENT DOCUMENTS

| | | | | |
|---|---|---|---|---|
| 2,791,287 A | | 5/1957 | Stolte | |
| 3,727,404 A | * | 4/1973 | Brewer | 60/430 |
| 3,896,617 A | * | 7/1975 | Kraina | 60/403 |
| 4,007,593 A | * | 2/1977 | Baker | 60/548 |
| 4,114,720 A | * | 9/1978 | Ericson et al. | 180/403 |
| 4,300,650 A | | 11/1981 | Weber | |
| 4,410,058 A | | 10/1983 | Dymond | |
| 4,651,841 A | * | 3/1987 | Adams | 180/422 |
| 4,765,427 A | | 8/1988 | Yonker | |
| 4,796,714 A | | 1/1989 | Momiyama | |
| 4,862,366 A | | 8/1989 | Morishita et al. | |
| 5,192,196 A | * | 3/1993 | Gettel | 417/300 |
| 5,564,516 A | | 10/1996 | Nimblett, Jr. | |
| 5,786,674 A | | 7/1998 | Kress | |
| 6,041,807 A | * | 3/2000 | Honaga et al. | 137/115.05 |
| 6,101,435 A | | 8/2000 | Baughn | |
| 6,419,042 B1 | * | 7/2002 | Stenstrom | 180/417 |
| 2005/0257987 A1 | * | 11/2005 | Bohm et al. | 180/419 |

FOREIGN PATENT DOCUMENTS

JP  11107936 A  4/1999
JP  2002255052 A  11/2002

* cited by examiner

*Primary Examiner*—Lesley Morris
*Assistant Examiner*—Marc A Scharich
(74) *Attorney, Agent, or Firm*—Martin Farrell; Michael Pruden (57) ABSTRACT

A power assist steering system for a vehicle, especially for a truck or commercial vehicle, is disclosed that includes a mechanical engine-driven power steering pump that pumps hydraulic fluid to a power steering unit, and an electrical pump adapted to pump hydraulic fluid so as to optimize a power steering flow to the power steering unit and to minimize internal pump flow.

21 Claims, 6 Drawing Sheets

POWER ASSISTED STEERING SYSTEM WITH AN AUXILIARY ELECTRIC PUMP

INTRODUCTION

The present invention relates to vehicle systems and methods, and the preferred embodiments relate to, among other things, improvements in power-assisted steering systems and methods, and, most preferably, to improvements in such systems and methods for trucks and/or commercial vehicles.

BACKGROUND

Many modern vehicles, including automobiles, light trucks, medium trucks, heavy trucks, busses, vans, delivery trucks, tractor trailer trucks, personal vehicles, commercial vehicles, etc., employ power assistance to facilitate manual steering.

While automobiles and lighter weight vehicles often employ power assisted steering systems, such power assisted steering systems have increased importance in applications involving trucks and larger commercial vehicles. Among other things, the steering demands imposed on the driver of the vehicle increases substantially as the size and weight of the vehicle increases (becoming very substantial for common trucks and large commercial vehicles), such that in many cases even with substantial power assistance, the required steering forces can be substantial.

Over the years, a variety of power assisted steering systems have been developed. These systems have utilized a number of power methodologies, such as, e.g., hydraulic power, electronic power and/or the like.

By way of example, a number of illustrative background systems are shown in the following documents, the entire disclosures of which are incorporated herein by reference:
   a) U.S. Pat. No. 6,041,807, which shows a "[f]low control device of a power steering apparatus;"
   b) U.S. Pat. No. 5,786,674, which shows a "[h]ydraulic servo control[,] particularly hydraulic power steering system for motor vehicles;"
   c) U.S. Pat. No. 5,564,516, which shows "a clutched electric motor steering system;"
   d) U.S. Pat. No. 5,192,196, which shows a "[f]low control orifice for parallel flow fluid supply to power steering gear;"
   e) U.S. Pat. No. 4,862,366, which shows a "[m]otor-driven power steering system for a vehicle;"
   f) Japanese Patent Publication No. 11107936 A, which apparently shows a "hydraulic unit" in which "[a]t low speed running time, the oil hydraulic pump 7 is driven by only the electric motor 14, and at high speed running time, the oil hydraulic pump 7 is driven by only the engine 13."
   g) Japanese Patent Publication No. 2002/255052 A, which apparently shows an "auxiliary machine drive device for [a] vehicle" having "two pump drive sources of the engine E and the motor M for driving a fluid pump of the auxiliary machine."

The demand confronted by a vehicle varies significantly depending on the size and weight of the vehicle. In this regard, there are a variety of vehicle types and classifications. By way of example, the (2001) vehicle classification system of the Federal Highway Administration (FHWA) of the United States Department of Transportation sets forth an exemplary methodology for identifying vehicle types, including, e.g.: class 1 (motorcycles); class 2 (passenger cars); class 3 (Other Two-Axle, Four-Tire Single Unit Vehicles); class 4 (buses); class 5 (Two-Axle, Six-Tire, Single Unit Trucks); etc., including classes of trucks up to class 13 (Seven or More Axle Multi-Trailer Trucks). Alternatively, trucks have been, in some instances, classified into categories of light, medium and heavy, with some illustrative weight classes as listed below in Table 1 (e.g., from the Washington State Department of Transportation).

TABLE 1

Vehicle Truck Classification

| Category | Class | GVWR | Representative Vehicles |
|---|---|---|---|
| Light | 1 | 0-27 kN<br>0-6,000 lbs. | pickup trucks, ambulances, parcel delivery |
|  | 2 | 27-45 kN<br>(6,001-10,000 lbs.) |  |
|  | 3 | 45-62 kN<br>(10,001-14,000 lbs.) |  |
| Medium | 4 | 62-71 kN<br>(14,001-16,000 lbs.) | city cargo van, beverage delivery truck, wrecker, school bus |
|  | 5 | 71-87 kN<br>(16,001-19,500 lbs.) |  |
|  | 6 | 87-116 kN<br>(19,501-26,000 lbs.) |  |
|  | 7 | 116-147 kN<br>(26,001 to 33,000 lbs.) |  |
| Heavy | 8 | 147 kN and over<br>(33,000 lbs. and over) | truck tractor, concrete mixer, dump truck, fire truck, city transit bus |

Gross Vehicle Weight Rating (GVWR): weight specified by manufacturer as the maximum loaded weight (truck plus cargo) of a single vehicle.

Conventionally, for trucks and the like vehicles, a single engine driven hydraulic pump is typically provided for power steering assist that is sized to have a sufficient output at high demand times (e.g., where vehicle speeds are near zero). However, in such conventional truck and the like systems, although there is a substantially reduced demand for steering power at highway speeds, the conventional systems actually provide a higher level of steering assist fluid flow at higher engine speeds than at lower engine speeds. This reduces system efficiency because the extra fluid flow is required to be dumped across a flow control device. By way of example, as described in, e.g., U.S. Pat. No. 5,192,196 incorporated by reference above, "[c]onventionally a [flow control device has a] flow control valve includes a spool slidable in a cylinder, a port connected to the pump outlet, a bypass port, a spring urging the spool to close the bypass port, an orifice connecting the pump outlet and the steering gear, and a passage connecting steering system pressure downstream from the orifice to an end of the spool. A pressure force develops on the spool due to this feedback pressure tending to combine with the spring force to close the bypass port. These spool forces are opposed by a force on the spool resulting from pressure upstream from the orifice tending to open the bypass port. Therefore, as pump flow rate increases, the pressure differential across the orifice increases and the spool moves in the valve cylinder against the spring force to open progressively the bypass port. As the bypass port opens," flow is reduced across the orifice and the differential pressure reduces tending to close the bypass port and maintain a controlled system flow. In conventional systems, the excess fluid flow provided at these higher engine speeds is, thus, dumped through such a control valve back to an inlet side of the pump, resulting in increased loads on the pump and a waste of engine power.

There is a substantial need for improved power assisted steering mechanisms, and, in particular, for improved mechanisms for use with trucks and commercial vehicles, which overcome the above and/or other problems in existing systems.

SUMMARY

As set forth below, the preferred examples of the present invention provide notable advancements over existing systems and devices.

In some examples, a system is provided that employs both an engine-driven power-steering pump and an electrically driven power steering pump in such a manner as to control and/or optimize the power steering flow and/or to minimize internal pump flow. Most preferably, the system controls the output of an electric pump, which operates in combination with a mechanically driven pump, in a manner to provide a uniquely controlled and/or optimized flow.

In some other examples, a power assistance steering system for a truck or commercial vehicle is provided that includes a) a mechanical engine-driven power steering pump that pumps hydraulic fluid to a power steering unit and b) an electric pump adapted to pump hydraulic fluid to the power steering unit concurrently with the mechanical engine-driven power steering pump so as to optimize a flow of hydraulic fluid within the system.

In the most preferred examples, the power assist steering system includes a controller for controlling flow from the electric pump. In some cases, the controller can be configured to vary flow of the electric pump based on hydraulic flow within the system, based on engine speed, based on vehicle speed, based on demands upon a driver's hand-wheel, based on steering speed, based on a change in assist level to be imparted and/or based on other conditions.

In some examples, a novel method for providing power assisted steering for a truck or commercial vehicle is, thus, achieved. Preferably, the method includes a) pumping hydraulic fluid to a power steering unit via a mechanical engine-driven pump and b) controlling an electric pump to concurrently pump hydraulic fluid toward the power steering unit in a manner so as to optimize a flow of hydraulic fluid within the system.

As explained above, the power-steering demands faced by a vehicle varies significantly with the size and weight of the vehicle. In this regard, while the various embodiments herein can be employed in virtually any type or category of vehicle, the most preferred embodiments are employed within trucks, and, in some preferred embodiments, within a truck weighing over about 10,000 pounds, and, in some more preferred embodiments, within a Medium or higher weight category truck.

Among some of the advantages and benefits that may be achieved with some implementations of the invention, a substantial reduction in mechanical engine-driven pump sizes can be achieved. In some examples, a method for implementing a downsized mechanical engine-driven power steering assistance device for a truck is provided. In one step, the method includes providing a mechanical engine-driven power steering assistance device which is sized so as to provide less than a required power to a power steering unit at idle speeds. In another step, the method includes providing an electric power steering assistance device that is adapted to concurrently supplement the mechanical engine-driven power steering assistance device at idle speeds, such that together the mechanical engine-driven power steering assistance device and the electric power steering assistance device provide a necessary power steering assistance to the power steering unit at idle. And, in another step, the method includes providing a controller to control the electric power steering assistance device such that at higher engine speeds, the electric power steering assistance device provides a reduced auxiliary assistance.

The above and/or other aspects, features and/or advantages of various examples will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which like reference numerals indicate like or similar parts, and in which.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described and/or illustrated herein.

1. General

In the preferred embodiments, a system is provided that employs both an engine-driven power-steering pump and an electrically driven power steering pump in such a manner as to control and/or optimize the power steering flow and/or to minimize internal pump flow. Most preferably, the system controls the output of an electric pump, which operates concurrently in combination with a mechanically driven pump, in a manner to provide a uniquely controlled and/or optimized flow.

2. Control and Optimization

In the most preferred embodiments, a controller or control unit is provided that controls the flow output from the electronic pump. In some examples, the control unit operates so as to maintain a desired level of power assistance (such as, e.g., a desired hydraulic flow) to a power steering system. In some examples, the control unit operates so as to maintain a substantially constant level of assistance (such as, e.g., providing a substantially constant hydraulic flow output).

In some illustrative embodiments, the control unit can be adapted so as to vary the output from the electronic pump based on a volume of fluid flow delivered to a power steering system. For example, one or more flow sensor(s) could be employed, whereby flow delivered to a power steering system can be controlled so to be maintained within a certain range or the like. In another example, a flow control valve could be implemented, such as, e.g., including any appropriate flow control valve as described above or as described in any of the above-noted patents incorporated herein by reference or as now or later known in the art to ensure a substantially constant flow delivered to a power steering system.

In some embodiments, the control unit can be adapted so as to vary the output from the electronic pump based at least in part on, for example, a speed of the vehicle (such as, e.g., employing a vehicle speed sensor), a steering speed of the steering wheel or the like (such as, e.g., employing a steering wheel speed sensor), a torque applied to the steering wheel or the like (such as, e.g., employing a steering wheel torque sensor), and/or based on other desired parameters. In various embodiments, a variety of sensors can be employed by those in the art, as would be appreciated based on this disclosure, such as, by way of example, devices as shown in the above-noted U.S. Pat. No. 4,862,366, the entire disclosure of which is incorporated herein by reference.

In some embodiments, the control unit can include one or more user interface (not shown) via which a user can input a desired level of assistance to be provided. For example, in some embodiments, a user can potentially increase and/or decrease power assistance through the user interface, which will, in turn, cause the control unit to increase or decrease output from the electric pump accordingly.

In some of the preferred embodiments, the auxiliary electronic pump is advantageously controlled such that the flow delivered to the power steering unit is maintained substantially constant, or, in some embodiments, within a limited range. In some other preferred embodiments, the flow output can be varied to some extent for certain purposes, such as for example: a) to reduce the power assist level to provide a stiffer feel of the steering at highway speeds; b) to increase the power assist level during a substantial turn; c) to increase the power assist level during a substantial drop in engine speed and/or engine RPMs; and/or the like.

Figure 4:
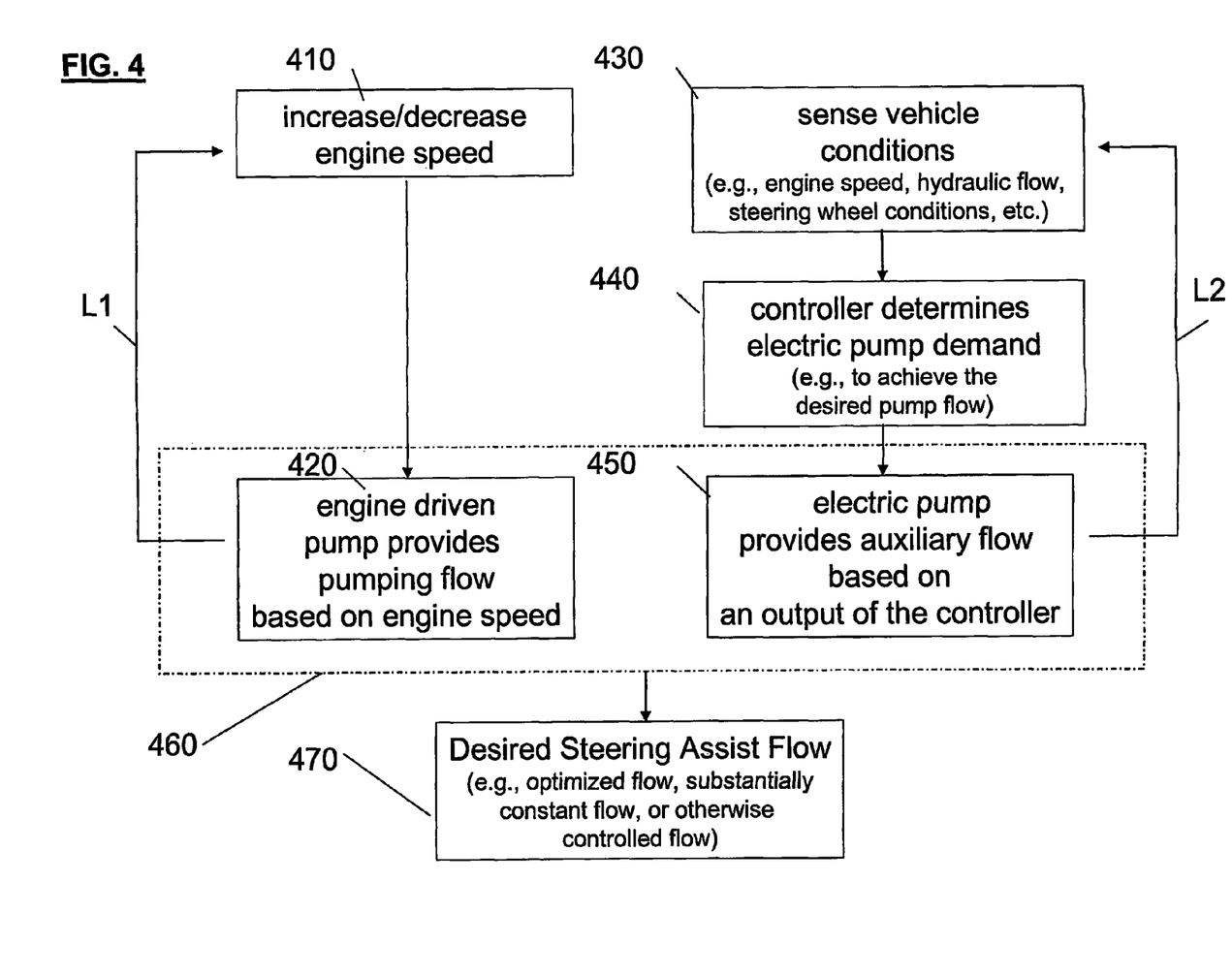
FIG. 4 is a flow diagram illustrating process steps according to some illustrative embodiments of the invention.

FIG. 4 illustrates some preferred process steps that can be employed to achieve a desired power-steering assist level based upon a uniquely controlled combination of a mechanical pump and an electric pump. In this regard, as shown in FIG. 4, in some preferred embodiments, a power-steering assist methodology can include the following illustrative steps: a) at step 410, a vehicle operator can cause the vehicle to increase or decrease its engine speed (such as, e.g., by depressing or raising a fuel pedal); b) then, at step 420, an engine-driven mechanical pump can, thus, provide a hydraulic pump flow that is based on the engine speed (such as, e.g., being generally proportional thereto in some embodiments); c) meanwhile, at step 430, the system can sense one or more vehicle condition (such as, e.g., employing one or more sensor); d) then, at step 440, a controller can be used to determine a desired electric pump flow based on the output from the one or more sensor; e) then, at step 450, the electric pump can provide an auxiliary hydraulic flow based on the determination made by the controller so as to achieve a combined flow schematically represented by reference 460. In this manner, as shown at step 470, the system can achieve a desired power-steering assist flow, whereby a desired power assistance can be achieved, based on circumstances.

By way of example, as discussed above, the desired power-steering assist flow may be a substantially constant flow, an optimized flow, and/or an otherwise controlled flow in some preferred embodiments. In FIG. 4, the return arrows L1 and L2 demonstrate that both the mechanical pump and the electrical pump processes are continuously or intermittently repeated and varied in real time during operation of the vehicle. In this regard, as the engine speed of the vehicle is varied, the corresponding engine-driven mechanical pump flow is varied; and, as the sensed vehicle conditions vary, the correspondingly-controlled electric pump flow is similarly varied.

3. Illustrative Embodiments

Figure 1:
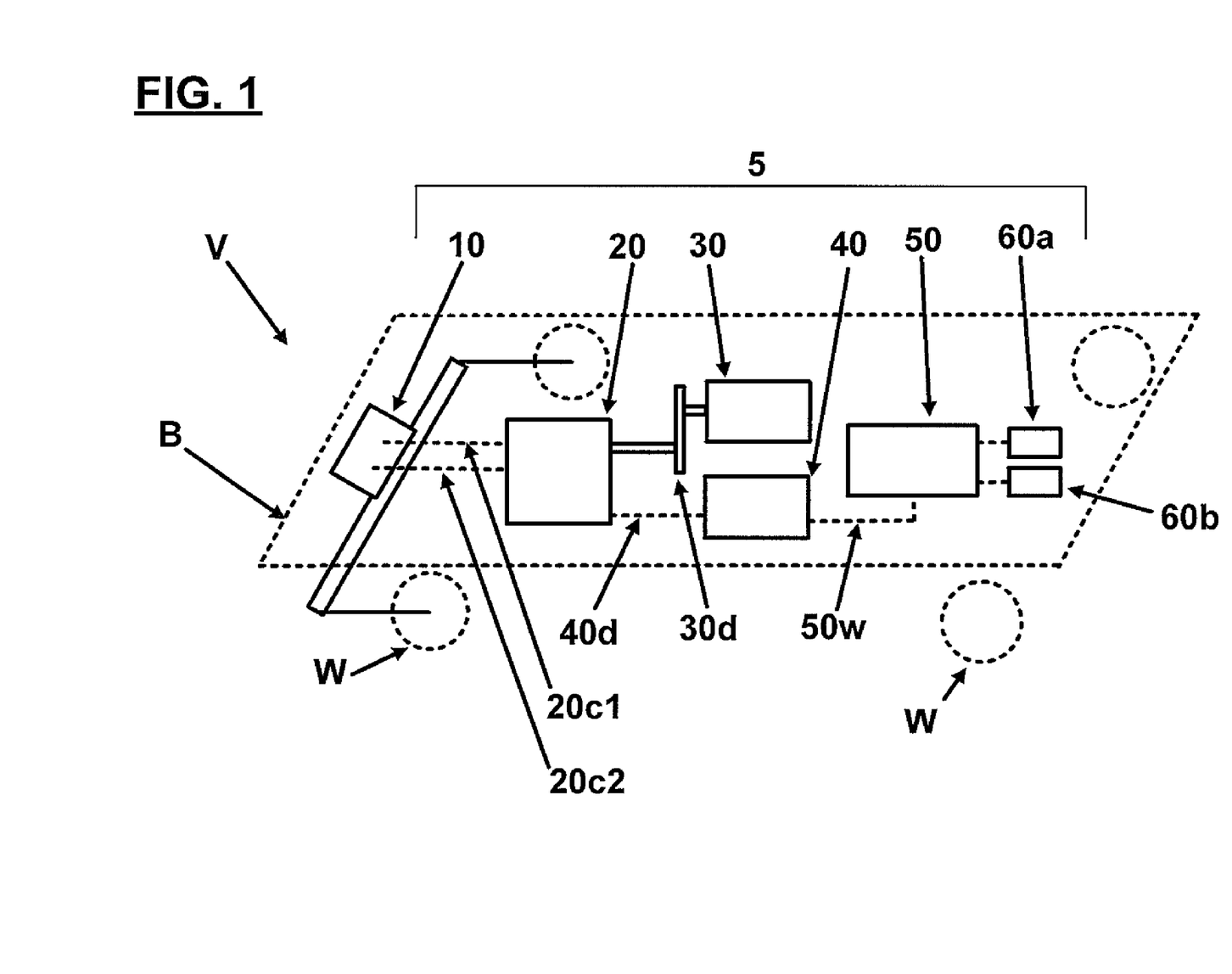
FIG. 1 is a schematic diagram depicting a vehicle having an electronic power assisted steering system according to some illustrative embodiments of the invention.

FIG. 1 shows some illustrative embodiments in which a vehicle V, such as, e.g., a truck or other commercial vehicle in some illustrative embodiments is provided with a hydraulic power assist steering system that includes a mechanical pump, driven by the main engine of the vehicle (i.e., the engine for effecting movement of the vehicle) and an auxiliary electrically driven pump. As shown in FIG. 1, the vehicle V includes a vehicle body B, which may include, e.g., a driver's cab area and a large cargo area for carrying goods, passengers or the like, such as, for example, a trailer or the like, as well as a plurality of wheels W. While the various embodiments described herein can be implemented within any vehicle types or categories described herein or otherwise known, in some preferred embodiments, systems and methods described herein can be employed within trucks within the classes 1-8 shown in Table 1 above, or, in some preferred embodiments, within trucks at higher classes, such as, e.g., at classes 3 or higher.

In some embodiments, such as for example shown in FIG. 1, a hydraulic power-assist steering system 5 is provided that includes: a power steering device 10 that provides power steering assistance via hydraulic fluid pumped through a supply line 20c1 and returned via a return line 20c2 leading to a mechanical pump 20, driven by the main engine 30 of the vehicle and an auxiliary electrically driven pump 40. The power steering device 10 can be similar to any power steering device as now or later known in the art. In this regard, the power steering device 10 can involve devices to assist steering based on a volume of hydraulic fluid pumped through the device, such as, by way of example, any of the devices shown or described in the documents incorporated herein by reference.

In some embodiments, the mechanical pump 20 can include, e.g., a mechanical drive mechanism 30d, such as, e.g., a drive pulley extending to a rotating output shaft of the motor 30 and/or any other appropriate mechanical drive linkage or drive mechanism. By way of example, drive mechanisms similar to that shown in any of the above-referenced documents can be employed, the entire disclosures of which are incorporated herein by reference.

In some embodiments, the electric pump 40 can include an electric motor that is adapted to effect movement of the mechanical pump 20 via a drive mechanism 40d. As with the drive mechanism 30d, any appropriate drive mechanism 40d can be employed by those in the art based on this disclosure. In the preferred embodiments, the system includes a controller or control unit 50 that is configured to control the rate of fluid flow provided by the electric pump 40. In some illustrative embodiments, the controller or control unit can include, e.g., a digital processor, a computer, a programmable logic controller and/or any other appropriate device now or later known in the art, whether implemented in hardware, firmware and/or software. Preferably, the controller 50 transmits a signal over a communication medium 50w (such as, e.g., wired or wireless media) to the electric pump 40. Although not illustrated, the electronic components can be powered by an electric power source, such as, e.g., an electric battery or the like as would be appreciated by those in the art based on this disclosure. While the controller 50 is preferably an electronic device, in some embodiments, a mechanical form of controller could be implemented. By way of example, in some embodiments, a mechanical structure could be employed that increases electrical current delivered to an electric motor at lower engine RPMs (such as, e.g., by decreasing resistance) and that gradually decreases electrical current delivered to the electric motor at higher engine RPMs (such as, e.g., by increasing resistance), in such a manner as to cause the electric motor to drive at a faster rate at lower RPMs of the vehicle engine. By way of example, power supplied to the electric motor could be adjusted using a movable conductor that is mechanically moved along a conductive coil (e.g., in relation to the engine's RPM speed), such that at some positions an increased resistance is experienced due to a greater length of conductive coil through which the electrical current will flow prior to reaching the electric motor. It should be appreciated based on this disclosure that a variety of other mechanical and electronic controllers can be employed in various embodiments.

In some preferred embodiments, the controller 50 receives signals from one or more input or sensor unit in order to acquire information regarding vehicle conditions or other parameters. In the illustrated example, two input or sensor units 60a and 60b are depicted. In various embodiments, such input or sensor units can provide one or more of the following outputs: a speed of the vehicle (such as, e.g., employing a vehicle speed sensor); an engine speed of the vehicle (such as, e.g., based on the engine's RPM); a steering speed of the steering wheel or the like (such as, e.g., employing a steering wheel speed torque sensor); a hydraulic fluid flow; a hydraulic fluid pressure; and/or other outputs. As described above, a variety of sensors can be employed by those in the art depending on circumstances.

Figure 2A:
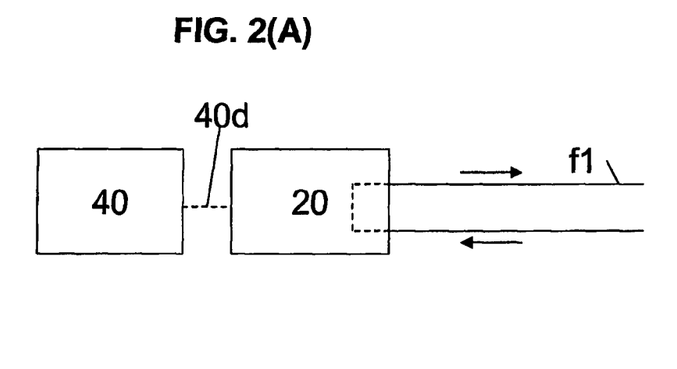
FIGS. 2(A), 2(B) and 2(C) are schematic diagrams depicting some illustrative designs for imparting auxiliary electronic power for a power assisted steering system.
Figure 2B:
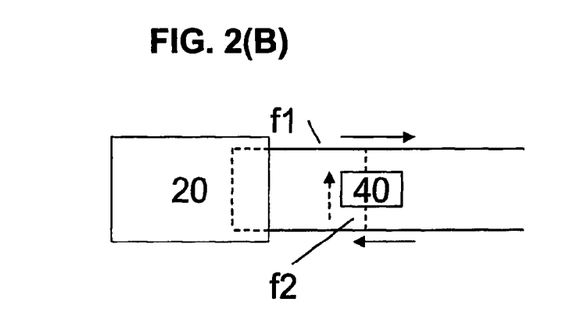
Figure 2C:
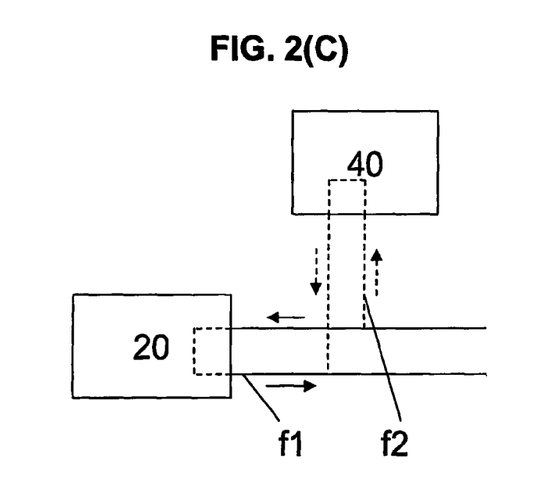

With reference to FIGS. 2(A) to 2(C), the flow of hydraulic fluid leading to the hydraulic steering unit 10 can be achieved in a variety of ways using a combined mechanical unit 20 and an electrical unit 40. In the examples depicted in FIGS. 1 and 2(A), an electric motor 40 can be arranged so as to assist or effect movement of the mechanical pump 20 via a drive mechanism 40d. As described above, any appropriate drive mechanism 40d can be employed by those in the art based on this disclosure. In these examples, as illustrated, the flow of the hydraulic fluid can be within a single flow loop or path f1 as shown, such as, e.g., affecting a flow in the direction of the depicted arrows.

In the example depicted in FIG. 2(B), an electronic motor or pump 40 can be arranged so as to create a parallel flow path through a separate flow path f2. In this manner, by way of example, the electric motor or pump 40 can be used to create a second, diverted, flow path. As a result, the overall flow volume through the unit 10 can be controlled based on the total volume of the flows through the mechanical pump 20 and the electric pump 40. FIG. 2(C) is another illustrative example that operates substantially similar to the example shown in FIG. 2(B), but with the position of the electric pump 40 laterally offset to a side of the flow path f1.

Figure 2D:
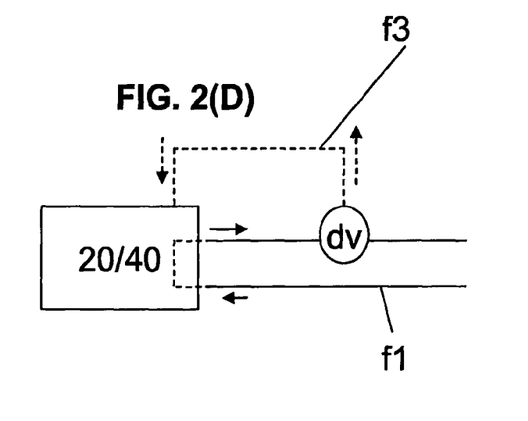
FIG. 2(D) is a schematic diagram depicting some illustrative embodiments employing a flow control valve.

With reference to FIG. 2(D), in some embodiments, excess fluid flow is dumped through a flow control valve dv via a flow path f3 back to an inlet side of the pump(s) 20 and/or 40 within the flow path f1 or the like. In some embodiments, the flow control valve dv can be adapted so as to maintain a certain level of flow through the flow path f1. In some examples, the flow control valve dv can include mechanical means for controlling flow (such as, e.g., operating as a overflow or relief valve). In some other examples, the flow control valve dv can be electronically controlled, such as, e.g., utilizing a controller or control unit, so as to vary the amount of fluid diversion based on the desired flow rate through the system. As described below with reference to FIG. 3(B), in some embodiments, by employing a flow control valve dv, a simplified structure can even be provided which obtains some advantages of a combined electric pump and mechanical pump (such as, e.g., the downsizing of the mechanical pump components), but without a required controller to vary the output of the electric pump.

Nevertheless, although FIG. 2(D) shows the implementation of a diverted flow path, in some preferred embodiments, a diverted flow is eliminated. Accordingly, inefficiencies or losses related to the implementation of a flow diversion can be eliminated in some preferred embodiments.

Figure 2E:
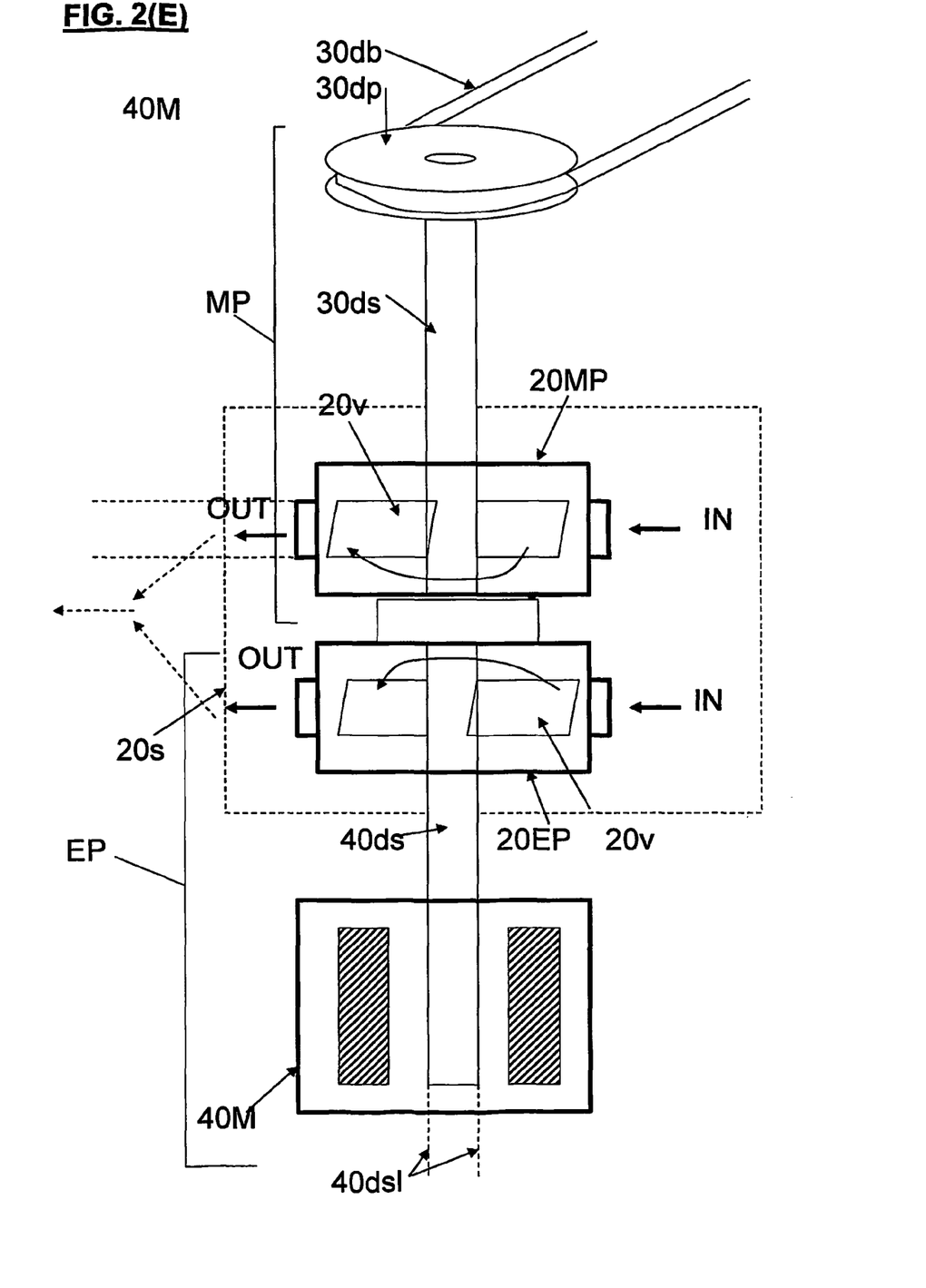
FIG. 2(E) is a partly schematic side view depicting illustrative electric and mechanical pump components in some illustrative and non-limiting embodiments.

FIG. 2(E) shows some illustrative mechanical and electric pump components according to some illustrative and non-limiting embodiments. It is contemplated that in some embodiments the electric pump and the mechanical pump can be substantially separate and independent from one another. On the other hand, in some embodiments, the electric pump and the mechanical pump can be substantially integrated together and/or can include some of the same components. By way of example, in some embodiments, an electric motor can be employed to facilitate or to increase pumping from a mechanical pump and/or, in some embodiments, both an electric pump and a mechanical pump can be used to effect movement of the same pumping mechanism (such as, e.g., the same rotor, turbine and/or other fluid pumping mechanism).

In the example shown in FIG. 2(E), an electric pump device EP is provided that includes an electric motor 40M having, e.g., a stator (i.e., a stationary field) and a rotor (i.e., a rotating field or armature) that operates through the interaction of magnetic flux and electric current to produce rotational speed and torque. In the illustrated example, the motor 40M rotates a drive shaft 40ds that is connected to a hydraulic fluid pumping mechanism 20EP. The pumping mechanism 20EP can include any appropriate pumping mechanism. In some embodiments, the pumping mechanism 20EP can include a plurality of vanes 20v that effect fluid flow in the direction of the arrows shown such that fluid enters into an inlet IN and exits from an outlet OUT.

In the example shown in FIG. 2(E), an engine-driven mechanical pump device MP is provided that includes a drive pulley 30dp connected to a driving belt 30db which is rotated via an output from the main engine (not shown in FIG. 2(E)). In the illustrated example, the drive pulley 30dp rotates a drive shaft 30ds that is connected to a hydraulic fluid pumping mechanism 20MP. As with the pumping mechanism 20EP, the pumping mechanism 20MP can include any appropriate pumping mechanism. In some illustrative embodiments, as shown, the pumping mechanism can include a plurality of vanes 20v that effect fluid flow in the direction of the arrows shown such that fluid enters into an inlet IN and exits from an outlet OUT.

As discussed above, the components shown in FIG. 2(E) can be varied widely based on the particular needs at hand. In some illustrative embodiments, the pumping mechanism 20EP and the pumping mechanism 20MP can be integrated together or can be the same mechanism (such as, e.g., depicted schematically in dashed lines at 20s). By way of example, in some embodiments a drive mechanism can be connected between the drive shaft 40ds and the drive shaft 30ds, such that the electric motor 40M can be used to operate the pumping mechanism 20MP. As another example, in some embodiments, the drive shaft 40ds and the drive shaft 30ds can be the same drive shaft, such that, e.g., the drive pulley 30dp and the electric motor 40M can both alternately or concurrently effect rotation of the same drive shaft. By way of example, as shown in dashed lines 40dsl in FIG. 2(E), the drive shaft could, e.g., pass through the motor and connect to a pulley that is similar to the drive pulley 30dp. In addition, as emphasized below, while the illustrated embodiment shows a pulley driven pump, the mechanisms for driving the pump can vary depending on circumstances. For example, in some more preferred embodiments, the pumps can be gear driven pumps.

4. Exemplary Configurations

In some preferred embodiments, the mechanical pump driven by the engine is sized and configured so as to provide a sufficient output at highway engine speeds (such as, e.g., at engine speeds, e.g., engine revolutions per minute (RPMs), that correspond to vehicle speeds of above about 50 to 60 miles per hour) without or substantially without auxiliary assistance from the electric pump. On the other hand, in some preferred embodiments, the electronically driven pump is preferably configured to concurrently provide auxiliary fluid for the increased power steering assistance demands confronted at lower vehicle speeds, such as, e.g., speeds at or near idle.

Figure 3A:
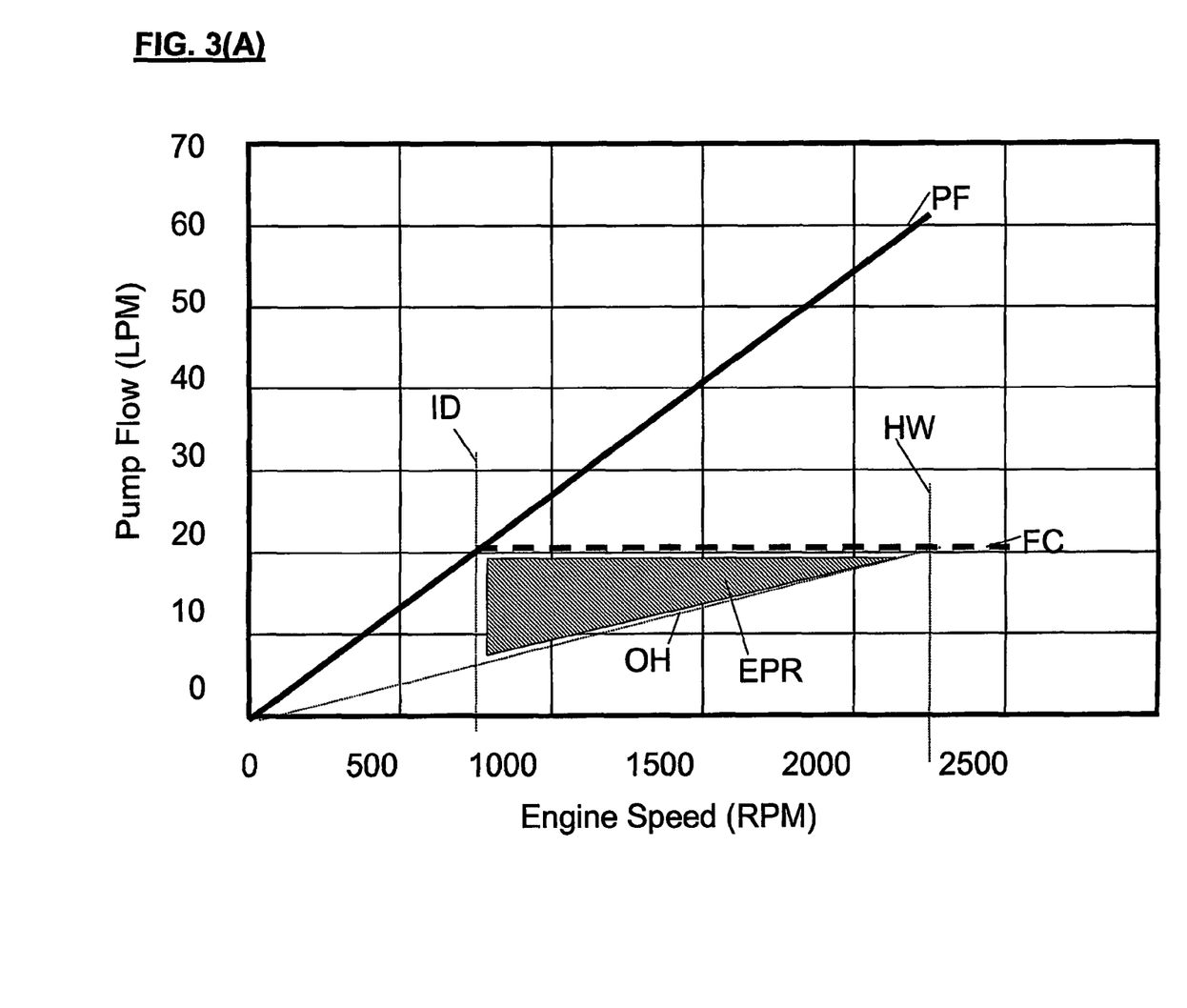
FIG. 3(A) is a graph representing some illustrative methods for controlling auxiliary electronic assistance for a power assisted steering system according to some embodiments.

FIG. 3(A) is an illustrative graph depicting pump flow to engine speed according to some illustrative embodiments. Among other things, FIG. 3(A) is helpful for demonstrating some of the preferred configurations in some examples. In FIG. 3(A), the vertical axis shows the pump flow. In this example, the pump flow is shown in liters per minute (LPM). In addition, the horizontal access shows engine speed. In this example, the engine speed is shown in revolutions per minute (RPM). While the example shown in FIG. 3(A) does depict an illustrative embodiment, the pump flows and engine speeds depicted are merely exemplary and a wide range of flows and speeds can be employed in various other examples.

As shown in FIG. 3(A), in some preferred embodiments, the pump flow from the mechanical pump component is a function of the engine speed (such as, e.g., being a generally linear function of the engine speed in this illustrative example). In this regard, in some background systems, the pump flow varies to engine speed as illustrated by the line PF.

The line PF helps to demonstrate the inefficiencies of existing systems in which a mechanical pump was generally sized to fulfill requirements at low or idle speeds (see, e.g., vertical line ID). Thus, in such background systems, the mechanical pump was substantially over-sized. Notably, these systems increased the pump flow drastically beyond the maximum demand at about the line ID. In this illustrative example, the maximum demand at ID is shown at about 20 LPM, while at about 2000 RPM, the pump flow was increased to nearly three times that maximum required amount in this background example.

According to the preferred embodiments, rather than sizing a mechanical pump to fulfill the requirements along the line PF, the mechanical pump is most preferably down-sized substantially and an electronic pump is preferably provided. For example, in the preferred embodiments, the mechanical pump is preferably sized to provide sufficient flow at highway speeds or at high engine speeds, such as, e.g., shown at line HW.

In this regard, the pump flow from the mechanical pump component is preferably, once again, a function of the engine speed (such as, e.g., being a generally linear function of the engine speed in this illustrative example). In some preferred embodiments, the pump flow varies to engine speed as illustrated by the line OH. Thus, in the preferred embodiments, the mechanical pump flow can be an effectively minimized and/or optimized hydraulic flow.

As shown in FIG. 3(A), in order to achieve a desired overall pump flow or an optimized hydraulic pump flow through the power steering unit 10, the system is preferably configured so as to establish a controlled flow FC (shown in dashed lines). In this illustrative example, the outputted controlled flow FC is substantially linear or substantially constant. However, in some other embodiments, the outputted controlled flow FC can have another functional relationship to engine speed or the like.

With reference to FIG. 3(A), the shaded region EPR depicts the electric pump requirement with relation to the engine speed. In this example, at lower engine speeds, such as, e.g., at idle ID, the electric pump has an increased (e.g., maximum) requirement. On the other hand, at the highway or high engine speeds, the electric pump has a reduced (e.g., minimum) requirement.

FIG. 3(A) illustrates a configuration in which the hydraulic pump is sized substantially such that at highway or high engine speeds, the engine-driven mechanical hydraulic pump is sized substantially to fulfill the requirements at such high-end speeds by itself without any auxiliary flow from the electric pump. In such an exact case, when such high-end speeds are reached, the output of the electric pump should be at or approximately zero. However, in some embodiments, this exact condition might not be implemented. For example, in some embodiments, the hydraulic pump can be sized slightly larger than that of the capacity of the pump for achieving line OH shown in FIG. 3. In that regard, the hydraulic pump can exhibit a flow, for example, in between the line OH and the line PF shown in FIG. 3(A). In such cases, the electric pump will, thus, in some embodiments have a smaller electric pump requirement EPR region. Among other things, such a sizing can be desirable in instances where the power steering requirements are very substantial, such as, e.g., in some larger commercial vehicles and trucks, where the load requirements upon the electric pump can otherwise be greater than optimal at lower engine speeds. In yet some other embodiments, the hydraulic pump can be sized to assume a flow rate that is actually lower and to the right of the line OH shown in FIG. 3(A). In this regard, in some embodiments, an electric pump could be relied upon to a larger extent throughout the range of the engine speeds (such as, e.g., from ID to HW), rather than diminishing to about zero flow at the high end speeds at HW.

In some illustrative and non-limiting examples, an automotive electro-hydraulic pump unit supplying about 7 to 10 liters-per-minute (LPM) at about 1400 pounds-per-square-inch (PSI) can be employed (e.g., operating at about 1 horse power (HP) or about 0.75 kilowatts (KW)).

In some preferred embodiments, the electric motor of the electric pump has a power output of between about 500 to 750 watts, and in some preferred embodiments a power output of about 550 watts.

In some illustrative and non-limiting embodiments, a mechanical pump that is engine-driven so as to direct hydraulic fluid to a power steering unit 10 can pump, e.g., about 14 cubic centimeters (cc) of hydraulic fluid per revolution.

In some illustrative and non-limiting embodiments, the system requirements of the power steering unit are at about 20 LPM or more (such as, e.g., shown in the illustrative example depicted in FIG. 3(A)), or, in some embodiments, about 16 LPM or more, or, in some embodiments, about 12 LPM or more, or, in some embodiments, about 8 LPM or more.

In some embodiments, at idle the electronic motor provides about 3 to 10 liters-per-minute (LPM) of the overall hydraulic flow, and the mechanical engine-driven pump provides about 6 to 18 liters-per-minute of hydraulic flow. In some embodiments, at idle the electronic motor provides about ⅛ to ⅔ of the total hydraulic flow, while in some embodiments, at idle the electronic motor provides about ⅙ to ½ of the total hydraulic flow.

In some illustrative and non-limiting examples, a truck or commercial vehicle engine will idle at about 750 RPM, will include about a 17 cubic centimeter (cc) per revolution pump displacement, and will include a system back pressure of about 100 PSI, or about 0.3 horse power. Moreover, the truck or commercial vehicle may, at about 2000 RPM with a 17 cc/revolution pump, provide about 23 hp. In addition, in some illustrative and non-limiting examples, a truck or commercial vehicle may have a maximum steering effort (steering pressure) of about 185 bar (e.g., about 2680 PSI). Accordingly, an illustrative maximum power required for steering may be, e.g., about 16 in^3/sec*2680=about 6.5 hp. These are merely some illustrative and non-limiting examples.

Figure 3B:
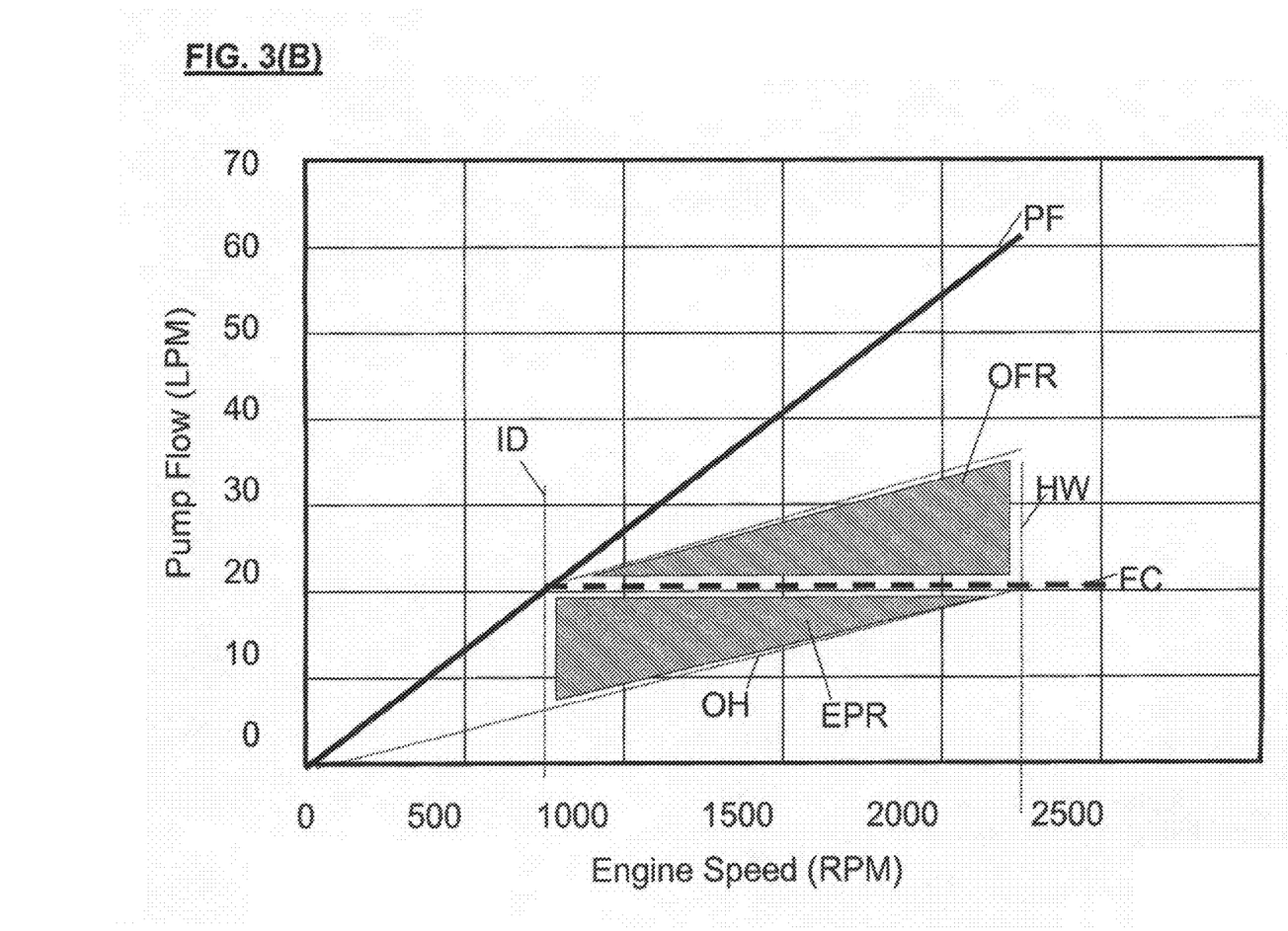
FIG. 3(B) is a graph representing some other illustrative methods for controlling auxiliary electronic assistance for a power assisted steering system according to some embodiments.

The graph shown in FIG. 3(B) helps to depict another embodiment in which an electric pump is operated at a substantially constant flow rate, without a controlled or varied flow in relation to, e.g., engine speed. In such an example, in some embodiments, the region OFR represents an over-flow-region in which excess hydraulic flow requirements are achieved. In this regard, in some instances, a diverter valve dv can be employed as described above with reference to FIG. 2(D). In such an example, the excess flow within the region OFR from both the mechanical and electric pumps can be directed to such a diverter valve dv. In some preferred embodiments, the diverter valve dv can involve a flow control valve similar to any appropriate flow control valve as described above or as described in any of the above-noted patents incorporated herein by reference or as now or later known in the art. Among other things, in this manner, in some embodiments, a simplified system can be achieved which eliminates the control of the electric pump, while diverting excess flow via the flow control valve dv. This embodiment, while less preferred and not having a number of advantages of other embodiments, can be desirable in some circumstances.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure.

By way of example, while some of the preferred embodiments described herein pertain to mechanical power-assist devices employing mechanically driven hydraulic pumps for imparting power to a power steering unit and electric power-assist devices employing electrically driven hydraulic pumps for imparting auxiliary power to the power steering unit, various other embodiments can employ other forms of power transmission, rather than or in addition to hydraulic power transmission. By way of example, in some other embodiments the mechanical power-assist devices can employing mechanically driven drive gears, drive chains, drive belts, drive linkages and/or the like providing power to a power steering unit and/or the electric power-assist devices can employ electrically driven drive gears, drive chains, drive belts, drive linkages and/or the like for imparting auxiliary power to the power steering unit. In particular, a wide variety of embodiments can be employed by those in the art based on this disclosure in which various forms of mechanically driven and/or electrically driven mechanisms are used. Thus, it is contemplated that various embodiments may employ a wide variety of mechanical and/or electrical drive mechanisms.

The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for implementing a downsized mechanical engine-driven power steering assistance device for a truck, comprising:

providing a mechanical engine-driven power steering assistance device which is sized so as to provide less than a required power to a power steering unit at idle speeds;

providing an electric power steering assistance device that is adapted to concurrently provide a supplementary assistance to assistance from said mechanical engine-driven power steering assistance device at idle speeds, such that together said mechanical engine-driven power steering assistance device and said electric power steering assistance device provide a necessary power steering assistance to the power steering unit at idle; and providing a controller to control the electric power steering assistance device such that at higher engine speeds, the electric power steering assistance device provides a reduced supplementary assistance to the assistance from said mechanical engine-driven power steering assistance device, wherein said reduced supplementary assistance is a reduced hydraulic fluid flow.

2. A power assistance steering system for a truck or commercial vehicle comprising:

a mechanical engine-driven power steering pump that pumps hydraulic fluid to a power steering unit;

an electric pump adapted to pump hydraulic fluid to the power steering unit concurrently with the mechanical engine-driven power steering pump so as to optimize a flow of hydraulic fluid within said system; and, a controller for controlling flow from said electric pump, wherein said controller is configured to vary flow of said electric pump based on engine speed.

3. The power assist steering system of claim 2, wherein said controller is further configured to vary flow of said electric pump based on hydraulic flow within said system.

4. The power assist steering system of claim 2, wherein said controller is further configured to vary flow of said electric pump based on demands upon a driver's hand-wheel.

5. The power assist steering system of claim 2, wherein said controller is further configured to vary flow of said electric pump based on steering speed.

6. The power assist steering system of claim 2, wherein said controller is further configured to vary flow of said electric pump based on a change in assist level to be imparted.

7. The power assist steering system of claim 2, wherein said controller is further configured to vary flow of said electric pump based on vehicle speed.

8. A power assistance steering system for a truck or commercial vehicle, comprising:

a mechanical engine-driven power steering pump that pumps hydraulic fluid to a power steering unit;

an electric pump adapted to pump hydraulic fluid to the power steering unit concurrently with the mechanical engine-driven power steering pump so as to optimize a flow of hydraulic fluid within said system; and, a controller for controlling flow from said electric pump, wherein said controller is configured to vary flow of said electric pump based on vehicle speed.

9. The power assist steering system of claim 8, wherein said controller is further configured to vary flow of said electric pump based on at least one of hydraulic flow within said system, demands upon a driver's hand-wheel, steering speed, a change in assist level to be imparted, and on engine speed.

10. A method for providing power assisted steering for a truck or commercial vehicle, comprising:

pumping hydraulic fluid to a power steering unit via a mechanical engine-driven pump; and controlling an electric pump via a controller to concurrently pump hydraulic fluid toward the power steering unit in a manner so as to optimize a flow of hydraulic fluid within said system, said controller varying flow of said electric pump based on engine speed.

11. The method for providing power assisted steering for a truck or commercial vehicle of claim 10, further including providing power assisted steering for a truck having a Gross Vehicle Weight Rating of over about 10,000 pounds.

12. The method for providing power assisted steering for a truck or commercial vehicle of claim 10, further including providing power assisted steering for a Medium or higher weight category truck.

13. The method for providing power assisted steering for a truck or commercial vehicle of claim 10, further including having said controller vary flow of said electric pump based on hydraulic flow within said system.

14. The method for providing power assisted steering for a truck or commercial vehicle of claim 10, further including having said controller vary flow of said electric pump based on demands upon a driver's hand-wheel.

15. The method for providing power assisted steering for a truck or commercial vehicle of claim 10, further including having said controller vary flow from said electric pump based on steering speed.

16. The method for providing power assisted steering for a truck or commercial vehicle of claim 10, further including having said controller vary flow from said electric pump based on a change in assist level to be imparted.

17. The method for providing power assisted steering for a truck or commercial vehicle of claim 10, further including having said controller vary flow of said electric pump based on vehicle speed.

18. A method for providing power assisted steering for a truck or commercial vehicle, comprising:

pumping hydraulic fluid to a power steering unit via a mechanical engine-driven pump; and controlling an electric pump via a controller to concurrently pump hydraulic fluid toward the power steering unit in a manner so as to optimize a flow of hydraulic fluid within said system, said controller varying flow of said electric pump based on vehicle speed.

19. The method for providing power assisted steering for a truck or commercial vehicle of claim 18, further including having said controller vary flow of said electric pump based on at least one of engine speed, hydraulic flow within said system, demands upon a driver's hand-wheel, steering speed, and a change in assist level to be imparted.

20. A method for providing power assisted steering for a truck or commercial vehicle, comprising:

pumping hydraulic fluid to a power steering unit via a mechanical engine-driven pump;

controlling an electric pump to concurrently pump hydraulic fluid toward the power steering unit in a manner so as to optimize a flow of hydraulic fluid within said system, and, further controlling said electric pump to provide a maximum auxiliary power steering assistance at low engine speed and decreasing auxiliary power steering assistance with increasing engine speed.

21. The method for providing power assisted steering for a truck or commercial vehicle of claim 20, further including at highway speeds having said electric pump provide substantially no auxiliary power steering assistance.

* * * * *